US012620381B2

(12) United States Patent
Misko et al.

(10) Patent No.: US 12,620,381 B2
(45) Date of Patent: May 5, 2026

(54) SWITCH LOCK APPARATUS AND METHOD THEREOF

(71) Applicant: Switchlock, LLC, Hendersonville, TN (US)

(72) Inventors: Joshua John Misko, Decatur, GA (US); Adam Samuel Mendel, Bend, OR (US)

( * ) Notice: Subject to any disclaimer, the term of this patent is extended or adjusted under 35 U.S.C. 154(b) by 0 days.

(21) Appl. No.: 18/783,228

(22) Filed: Jul. 24, 2024

(65) Prior Publication Data

US 2025/0316254 A1 Oct. 9, 2025

Related U.S. Application Data

(62) Division of application No. 17/323,596, filed on May 18, 2021, now Pat. No. 12,073,815.

(60) Provisional application No. 63/026,489, filed on May 18, 2020.

(51) Int. Cl.
*G10H 3/18* (2006.01)
*G10H 1/00* (2006.01)

(52) U.S. Cl.
CPC .......... *G10H 3/181* (2013.01); *G10H 1/0008* (2013.01); *G10H 2220/461* (2013.01)

(58) Field of Classification Search
CPC . G10H 3/181; G10H 1/0008; G10H 2220/461
USPC .......... 84/742
See application file for complete search history.

(56) References Cited

U.S. PATENT DOCUMENTS 2,246,919 A * 6/1941 Krantz .......... H01H 3/20 74/532
4,876,425 A * 10/1989 Woskow .......... H01R 13/443 200/322
D353,580 S * 12/1994 Woehler .......... D13/173
9,070,353 B2 * 6/2015 Gross .......... G10H 3/186
9,305,525 B2 * 4/2016 Park .......... G10D 1/085

OTHER PUBLICATIONS

Thrustmaster TH8A manual, May 13, 2015 (https://web.archive.org/web/20150513070118/https://ts.thrustmaster.com/download/accessories/Manuals/TH8/TH8A_Shifter_Manual.pdf). (Year: 2015).*

* cited by examiner

*Primary Examiner* — Jeffrey Donels
*Assistant Examiner* — Philip G Scoles
(74) *Attorney, Agent, or Firm* — Patterson Intellectual Property Law, P.C.; Mark A. Kilgore

(57) ABSTRACT

A switch lock apparatus for a guitar having a pickup selector switch is disclosed herein for locking a position of the pickup selector switch. The switch lock apparatus may include a body plate, a mounting hole, a switch opening defined in the body plate which is configured to receive the pickup selector switch. The switch lock apparatus may also include at least one first side receptacle positioned along the first switch opening side and at least one second side receptable positioned along the second switch opening side. The at least one second side receptacle may be offset from the at least one first side receptacle along the switch opening length to define a central passageway that enables free movement of the pickup selector switch. The switch lock apparatus may define a locked position when the pickup selector switch is received by one of the first or second side receptacles.

6 Claims, 8 Drawing Sheets

SWITCH LOCK APPARATUS AND METHOD THEREOF

CROSS-REFERENCES TO RELATED APPLICATIONS

This application claims benefit of the following patent application which is hereby incorporated by reference: U.S. patent application Ser. No. 17/323,596 filed May 18, 2021, which claims benefit of U.S. Provisional Application No. 63/026,489 filed May 18, 2020, entitled "Switch Lock Apparatus and Method Thereof."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present invention relates generally to guitar pickup selector switches.

More particularly, this invention pertains to selecting and locking a selected position of a guitar's pickup selector switch.

2. Description of the Prior Art

Many electric guitars have a pickup selector switch positioned on the body of the guitar. Pickup selector switches include "blade switches" as typically used by Fender, "toggle switches" as typically used by Les Paul, and "mini-switches." There are three main varieties of blade pickup selector switches, namely, a three-position pickup selector switch, a four-positioned pickup selector switch, and a five-position pickup selector switch. Each position of the pickup selector switch is configured to produce a different tone that the guitarist may want to use for each particular song they are playing.

The issue with pickup selector switches is that because they are positioned on the body of the guitar, on the same side of the guitar as the strings, and near the strings, they can be accidentally hit and moved to a different position while playing the guitar. Prior solutions to the issue of accidental actuation of the pickup selector switch have attempted to minimize the likelihood of hitting the switch through the use of a guard that is attached to the body of the guitar proximate the pickup selector switch. These guards are basically obstructions that protrude from the guitar body and which attempt to prevent accidental contact with the pickup selector switch while playing the guitar. These guards are preventative measures which attempt to mitigate the likelihood of accidentally changing the position of the pickup selector switch, however, they do not prevent a change in position if the selector switch is hit.

A secondary issue affecting these aftermarket pickup switch guards is that in order to install them, a permanent modification to the guitar may need to be made, for example, new holes for mounting screws or the like. These permanent modifications may void factory warranties, as well as, severely affect the guitar's resell value.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The present disclosure provides a solution to the issues surrounding accidental actuation of a guitar's pickup selector switch while playing the guitar. The present disclosure provides a switch lock apparatus which is positioned around the switch using existing guitar hardware (e.g., the mounting positions and methods used to mount the pickup selector switch to the guitar).

The disclosed switch lock apparatus may be pivotally or otherwise coupled to the guitar such that each of a plurality of receptables may receive the pickup selector switch when in a selected position in order to prevent accidental actuation of the guitar's pickup selector switch while playing the guitar.

In a particular embodiment, an exemplary switch lock apparatus as disclosed herein may include a body plate, a switch opening, at least one first side receptacle, and at least one second side receptacle. The body plate may have a first body plate end, a second body plate end, and a mounting hole defined therethrough. The mounting hole may be positioned closer to the first body plate end than to the second body plate end. The switch opening may be defined in the body plate and may be positioned between the mounting hole and the second body plate end. The switch opening may include a first switch opening end, a second switch opening end, and a switch opening length defined between the first and second switch opening ends. The switch opening may further include first and second switch opening sides defined between the first and second switch opening ends. The switch opening is configured to receive the pickup selector switch. The at least one first side receptacle may be positioned along the first switch opening side. The at least one second side receptable may be positioned along the second switch opening side. The at least one second side receptacle may be offset from the at least one first side receptacle along the switch opening length.

In an exemplary aspect according to the above-referenced embodiment, the mounting hole may be configured to receive a switch screw of the pickup selector switch of the guitar.

In another exemplary aspect according to the above-referenced embodiment, the switch lock apparatus may further include a sleeve positioned within the mounting hole. In accordance with this embodiment, the sleeve may be configured to receive a switch screw of the pickup selector switch of the guitar and the sleeve is configured to allow pivotal movement of the body plate.

In another exemplary aspect according to the above-referenced embodiment, the sleeve may be a press fit sleeve.

In another exemplary aspect according to the above-referenced embodiment, the switch lock apparatus may further include a washer positioned on top of the sleeve.

In another exemplary aspect according to the above-referenced embodiment, the switch opening may include a central passageway defined along the switch opening length between the at least one first side receptacle and the at least one second side receptacle. In accordance with this embodiment, the central passageway may be at least as wide as the pickup selector switch.

In another exemplary aspect according to the above-referenced embodiment, each of the at least one first side receptacle and at least one second side receptacle may include at least two receptacles separated by a gate. Each gate may at least in part define one of the first switch opening side or the second switch opening side.

In another exemplary aspect according to the above-referenced embodiment, one or more of the at least one first side receptacle or the at least one second side receptacle associated with each of the first switch opening end and the second switch opening end includes an elongated depth. In accordance with this embodiment, the elongated depth may be configured to accommodate at least a portion of a protector knob of the pickup selector switch.

In another exemplary aspect according to the above-referenced embodiment, the switch lock apparatus may further include a base portion configured to pivotally receive the body plate. The base portion may include a cylindrical opening configured to receive a base cylinder of the pickup selector switch.

In another exemplary aspect according to the above-referenced embodiment, the switch lock apparatus may further include a base cylinder nut configured to attach the base portion to the base cylinder. In accordance with this embodiment, the base cylinder nut may be configured to be positioned between the base portion and the body plate.

In another exemplary aspect according to the above-referenced embodiment, the base portion may include a vertical portion configured to pivotally receive the body plate. In accordance with this embodiment, the vertical portion may be at least as tall as the base cylinder nut.

In another embodiment, a method of selectively locking a pickup selector switch of a guitar is disclosed herein. The method includes (a) freely moving the pickup selector switch to a selected position when a switch lock apparatus is positioned in a neutral position, the neutral position associated with the pickup selector switch being positioned in a central passageway of the switch lock apparatus; and (b) receiving the pickup selector switch into one of a plurality of receptacles of the switch lock apparatus to define a locked position with the pickup selector switch locked in the selected position.

In an exemplary aspect according to the above-referenced embodiment, step (b) may further comprise pivotally rotating the switch lock apparatus relative to the pickup selector switch.

In another exemplary aspect according to the above-referenced embodiment, the step (b) may further comprise pivotally rotating the switch lock apparatus clockwise relative to the pickup selector switch to position the pickup selector switch in a first side receptacle of the plurality of receptacles defined along a first switch opening side of the switch lock apparatus. In accordance with this embodiment, step (b) may further comprise pivotally rotating the switch lock apparatus counter-clockwise relative to the pickup selector switch to position the pickup selector switch in a second side receptacle of the plurality of receptacles defined along a second switch opening side of the switch lock apparatus.

In another exemplary aspect according to the above-referenced embodiment, the first side receptacle is offset from the second side receptacle relative to a switch opening length of the switch lock apparatus.

In another exemplary aspect according to the above-referenced embodiment, the method may further comprise, prior to step (a), receiving the pickup selector switch through a switch opening of the switch lock apparatus, and pivotally coupling the switch lock apparatus to the guitar adjacent to the pickup selector switch. In accordance with this embodiment, the method may further comprise, coupling the switch lock apparatus to the guitar using a mounting hole of the switch lock apparatus offset from the switch opening.

Numerous other objects, advantages and features of the present disclosure will be readily apparent to those of skill in the art upon a review of the following Drawings and Detailed Description.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
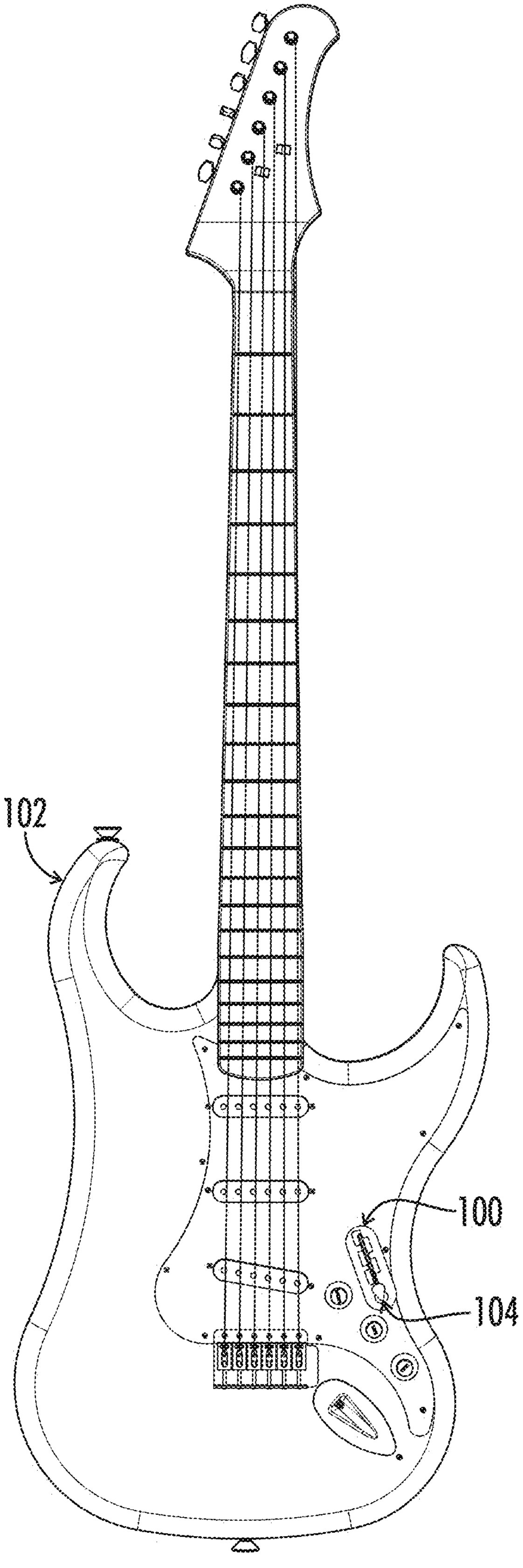
FIG. 1 is a perspective view of a guitar having a switch lock apparatus installed around a pickup selector switch (e.g., a five-position switch) of the guitar in accordance with the present disclosure.

Referring to FIGS. 1 and 2, a switch lock apparatus 100 is shown installed on the body of a guitar 102 surrounding the pickup selector switch 104 of the guitar 102. The pickup selector switch, as illustrated, is a five-position blade-type pickup selector switch. In other optional embodiments, the type of pickup selector switch may be different. The switch lock apparatus may be coupled to the guitar using existing hardware of the guitar, namely, a pickup switch mounting screw 106, in instances where the switch lock apparatus is retrofit installed onto an existing guitar. In some embodiments, the same mounting position may be utilized, but a longer mounting screw may be provided to account for any additional increase in the material thickness of the apparatus. In other embodiments, the switch lock apparatus may be incorporated into the guitar during manufacturing. The switch lock apparatus may be configured to lock the pickup selector switch in one of its various positions (e.g., as shown, one of its five positions) such that it cannot accidentally be actuated and moved to a different position while playing the guitar.

Figure 2A:
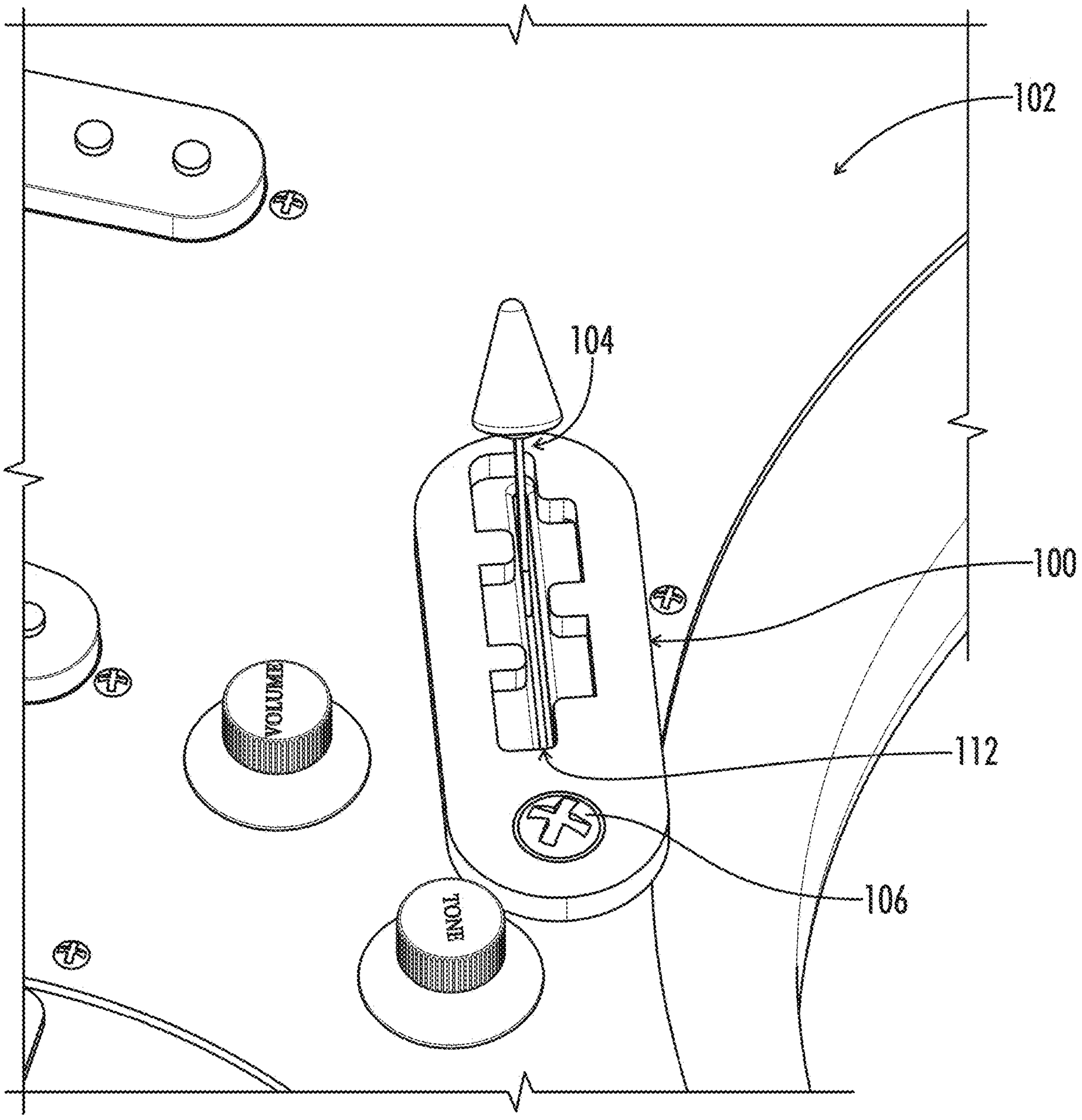
FIG. 2A is an enlarged perspective view of the guitar of FIG. 1 with the switch lock apparatus in a neutral position in accordance with the present disclosure.
Figure 2B:
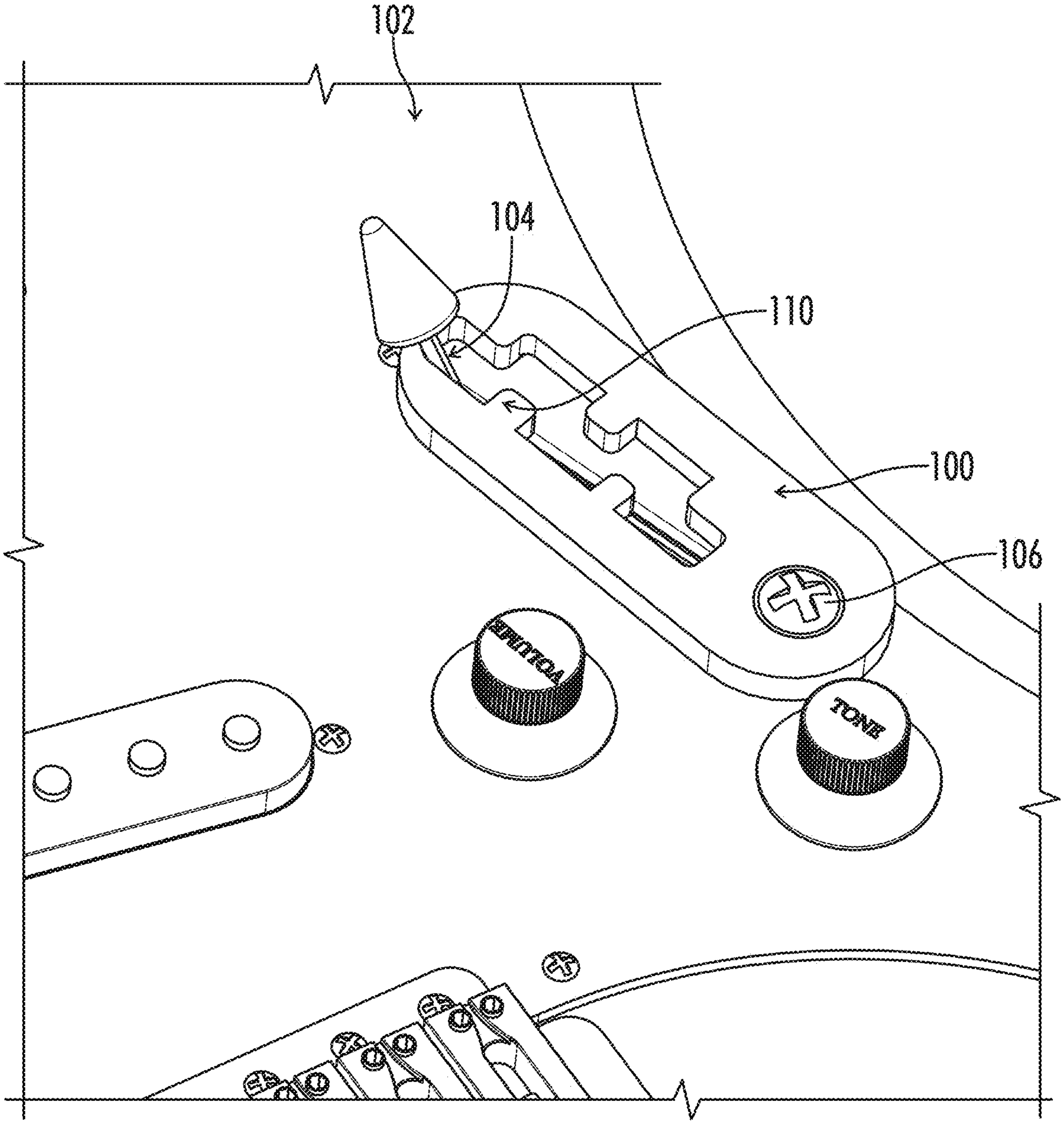
FIG. 2B is an enlarged perspective view of the guitar of FIG. 1 with the switch lock apparatus in a locked position in accordance with the present disclosure.

The switch lock apparatus can be positioned in a locked configuration 110 by pivoting the switch lock apparatus about the pickup switch mounting screw such that the pickup selector switch cannot move between its five positions, as shown in FIG. 2B. The switch lock apparatus can also be positioned in a neutral configuration 112 such that the pickup selector switch can freely move between any of its positions without being interfered with by the switch lock apparatus, as shown in FIG. 2A.

The switch lock apparatus 100 is shown in greater detail in FIGS. 3-6. The switch lock apparatus may comprise a body plate 120 and a switch opening 130 defined in the body plate and configured to receive the pickup selector switch 104 of the guitar 102. The body plate may have a first body plate end 122, a second body plate end 124 and a mounting hole 126 defined through the body plate. The mounting hole may be positioned closer to the first body plate end than to the second body plate end.

The switch opening 130 may be defined through the body plate 120 and may further be positioned between the mounting hole 126 and the second body plate end 124. The switch opening may include a first switch opening end 132, a second switch opening end 134 and a switch opening length 136 defined between the first and second switch opening ends. The switch opening may further include a first switch opening side 140 and second switch opening side 142, each defined between the first and second switch opening ends. As previously stated, the switch opening is configured to receive the pickup selector switch 104 when installed on the guitar 102.

The switch lock apparatus 100 may further comprise at least one first side receptacle 150 and at least one second side receptacle 152. The at least one first side receptacle is positioned along the first switch opening side 140. The at least one second side receptacle is positioned along the second switch opening side 142. Each of the at least one first and second side receptacles 150, 152 are configured to receive the pickup selector switch 104 based on its alignment with the pickup selector switch in a selected position. In other words, each of the five positions of the pickup selector switch may align with the at least one first or second side receptacles. When the pickup selector switch 104 is received by one of the at least one first or second side receptacles, the pickup selector switch is locked in said position.

The at least one second side receptacle 152 may be offset from the at least one first side receptacle 150 along the switch opening length 136. The offset may be necessary in certain instances wherein the distance between adjacent selectable positions of the pickup selector switch is less than or equal to the width of the pickup selector switch. Accordingly, adjacent selectable positions of the pickup selector switch may be received by a different one of the at least one first or second side receptable (e.g., alternating between the first side receptable and the second side receptable). In some embodiments, the at least one first 150 and at least one second 152 side receptacles may be on the same switch opening side. Thus, a first receptacle and a second receptacle may be positioned along the same switch opening side 140. In some embodiments, the receptacles may be positioned only on one switch opening side, such that switch opening side 140 may include 2, 3, 4, or more receptacles positioned along the side, and thus they are not offset from one another.

As can best be seen in FIGS. 2A and 2B, the mounting hole 126 of the body plate 120 is configured to receive the pickup switch mounting screw 106. Referring back to FIGS. 3-6, the switch lock apparatus 100 may further comprise a sleeve 160 positioned within the mounting hole 126 of the body plate 120. The sleeve may be configured to receive the pickup switch mounting screw 106. The sleeve is configured to allow pivotable movement of the body plate without causing the pickup switch mounting screw to loosen. In certain embodiments, the sleeve is a press-fit sleeve, however, in other embodiments the sleeve may be different.

The switch opening 130 may further include a central passageway 154. The central passageway may be defined parallel to the switch opening length 136 between the at least one first side receptacle 150 and the at least one second side receptacle 152. The central passageway when aligned with the pickup selector switch 104 may allow the pickup selector switch to move freely between each of its selectable positions. As illustrated in FIGS. 3-6, the switch lock apparatus 100 may be configured to be used with a five-position pickup selector switch. In other embodiments, the switch lock apparatus may be used with two-position switches, three-position switches, or four-position switches, as well as other types of pickup selector switches. Any number of positions may be created based on this disclosure including more than 5 positions. As previously discussed, the receptacle for each selector position may be staggered along a first switch opening side 140 and a second switch opening side 142, or the receptacles may be positioned along a single switch opening side.

In certain optional embodiments, a width of the central passageway may be greater than a depth of the pickup selector switch such that the pickup selector switch has enough clearance to move easily within the central passageway 154. In certain optional embodiments, a depth of each of the at least one first and second side receptacles may be equal to the depth of the pickup selector switch. In other optional embodiments, the depth of each of the at least one first and second side receptacles may be at least half as large as the depth of the pickup selector switch such that there is enough grab to prevent the pickup selector switch from pivoting the switch lock apparatus back into the neutral configuration.

Figure 3:
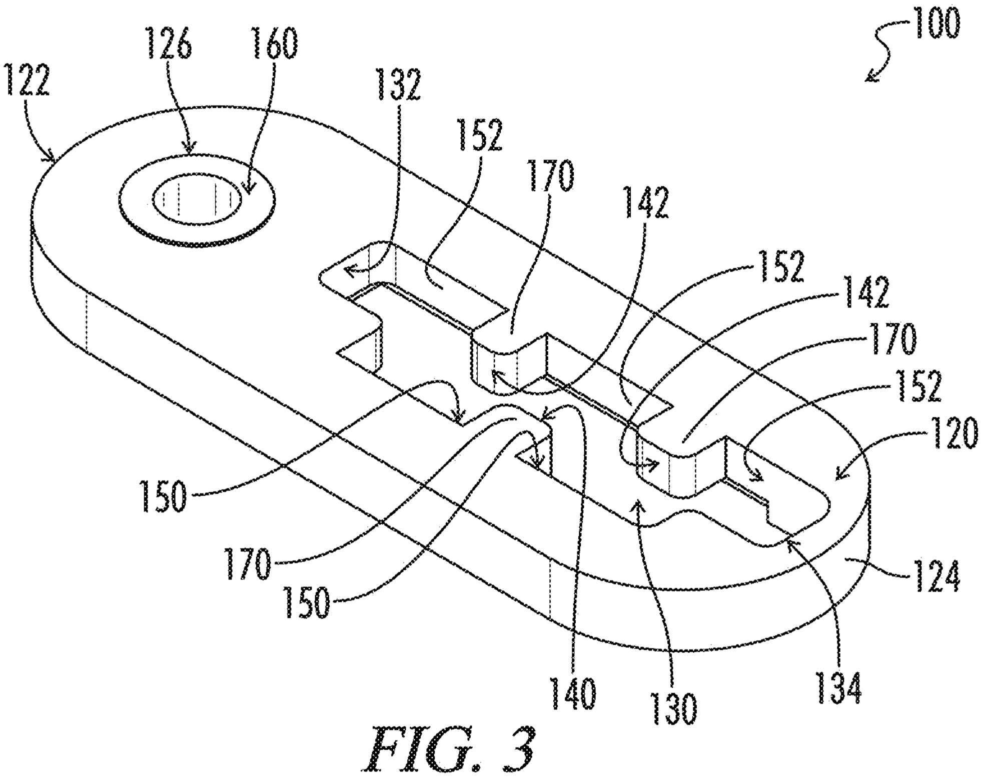
FIG. 3 is an upper perspective diagram of the switch lock apparatus of FIG. 1 in accordance with the present disclosure.

As illustrated, the at least one first side receptacle includes two receptacles and the at least one second side receptacle includes three receptacles. This allows each of the five positions of the pickup selector switch 104 to be received in one of those five receptacles depending on the selected position of the pickup selector switch. Each adjacent receptacle of the at least one first side receptacle and each adjacent receptacle of the at least second side receptacle is separated by a gate 170. Each of the gates 170 may also be referred to as teeth. Each gate terminates adjacent to the central passageway 154 thus defining the depth of each of the at least one first and second side receptacles perpendicular to the switch opening length 136. In some embodiments, the gates are configured such that gates positioned on opposing sides do not overlap with each other and therefore do not obstruct the central passageway 154. For example, as shown in FIG. 3, the single gate 170 on switch opening side 140 terminates at a distance that does not overlap with the two gates 170 on switch opening side 142. The termination of each gate on opposing sides should be configured such that the central passageway 154 is created, and the selector switch may move freely without interference from any one gate. The ends of the gates 170 adjacent to the central passageway 152 may defined the first and second switch opening sides 140, 142.

Figure 7:
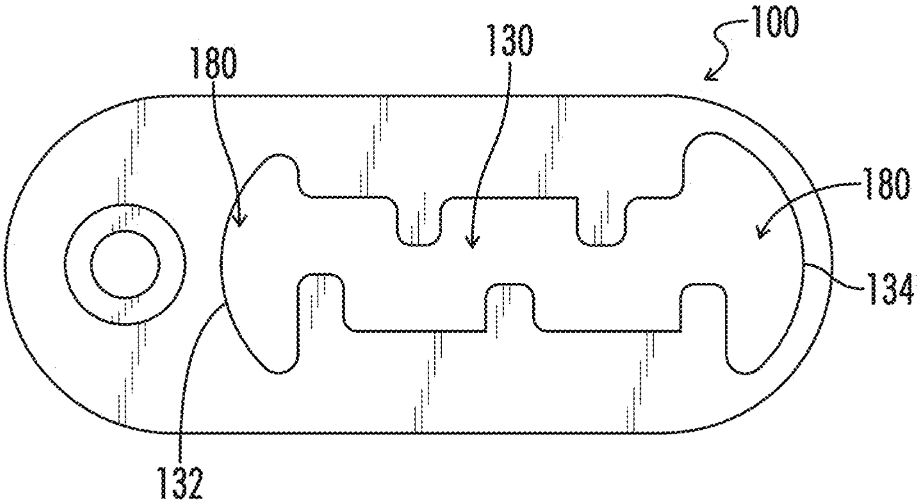
FIG. 7 is a top plan diagram of another embodiment of the switch lock apparatus of FIG. 1 in accordance with the present disclosure.

In some embodiments, the selector switch 104 may move along an arc as it is positioned in each successive switch position. Thus, the selector switch 104, or more specifically, the protector knob 108 may be at a higher position in the middle positions (assuming the arc is at the highest position in the middle) than when the switch is located at either of the end positions. Due to this arc configuration, the protector knob 108 of the selector switch 104 may be caused to contact the switch lock apparatus 100 when the switch is located at either of the end switch positions. To compensate for this arc configuration, as shown in FIG. 7, the receptacles located at the ends 132, 134 of the switch opening 130 may include an elongated depth 180 (or wing) that may allow for the protector knob 108 to seat within the receptacle and allow for more secure locking of the selector switch 104 along its entire arc.

In certain embodiments, the switch lock apparatus 100 may be retrofit installed onto the guitar 102. A method of installing the switch lock apparatus 100 onto a guitar 102 may include the following steps. First, the method may include removing a protector knob 108 from the pickup selector switch 104. Next, the method may include removing the pickup switch mounting screw 106 located nearest to the guitar bridge. In other optional embodiments, the method may alternately include removing the pickup switch mounting screw located furthest from the guitar bridge. Third, the method may include positioning the switch opening 130 of the body plate 120 over the pickup selector switch 104 and aligning the mounting hole 126 of the body plate and sleeve 160 with the hole 106H. Fourth, the method may further include positioning a washer 162 of the switch lock apparatus 100 on top of the mounting hole 126 such that a washer hole of the washer is aligned with the mounting hole. The washer in conjunction with the sleeve 160 may further enable the body plate 120 to pivot without loosening the pickup switch mounting screw 106 once reinstalled. Next, the method may further include reinstalling the pickup switch mounting screw 106 into its hole 106H through the washer 162 and the mounting hole 126 and/or sleeve 160. Finally, the method may further include reattaching the protector knob 108 onto the pickup selector switch 104.

In other optional embodiments, the guitar 102 may come with a switch lock apparatus 100 preinstalled thereon or incorporated therewith during manufacturing of the guitar. In accordance with this embodiment, the switch lock apparatus may be altered such that it can be integrally incorporated into the guitar. In such embodiments, the switch lock apparatus may only necessarily need incorporate the gate system (i.e., the switch opening 130, the central passageway 154 and the at least one first and second side receptacles 150, 152) in order to be able to lock the pickup selector switch.

In certain optional embodiments, rather than being pivotally attached the guitar 102, the switch lock apparatus may be slidably coupled to the guitar such that the switch lock apparatus is able to slide perpendicularly relative to the switch opening length 136. In other optional embodiments, the switch lock apparatus may be coupled to the guitar differently such that it is still able to move relative to the pickup selector switch and receive the pickup selector switch in one of the at least one first or second side receptables 150, 152.

Figure 4:
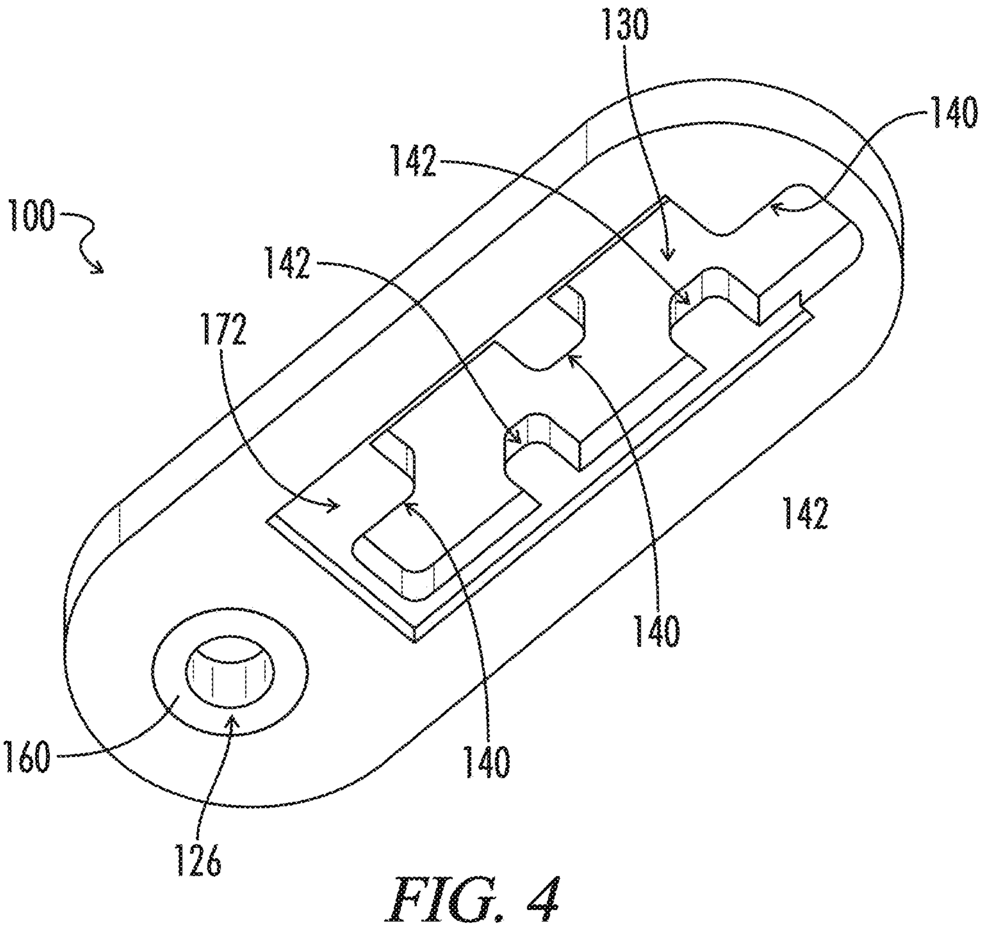
FIG. 4 a lower perspective diagram of the switch lock apparatus of FIG. 1 in accordance with the present disclosure.
Figure 5:
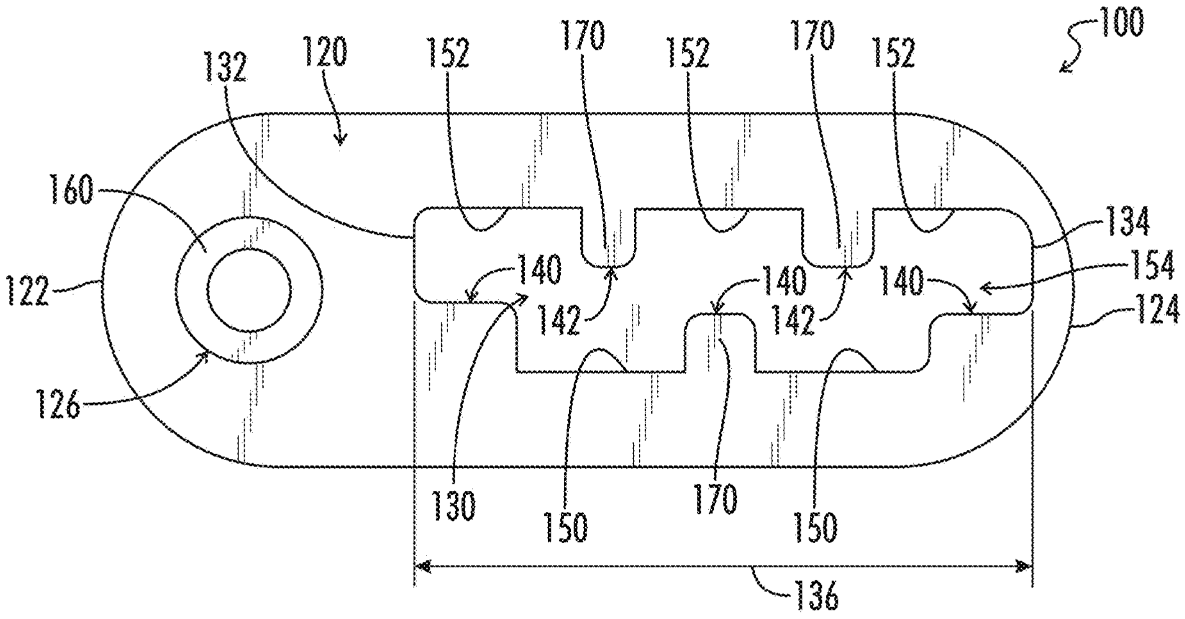
FIG. 5 is a top plan diagram of the switch lock apparatus of FIG. 1 in accordance with the present disclosure.
Figure 6:
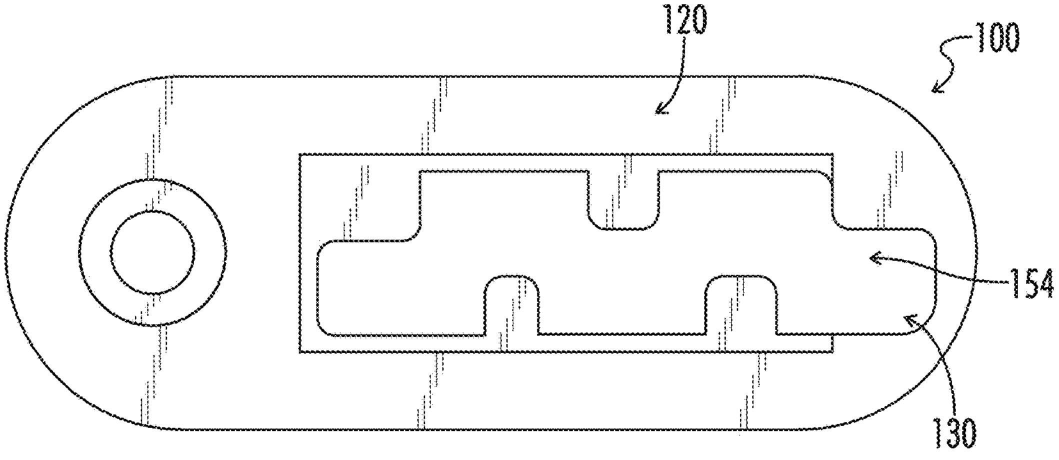
FIG. 6 is a bottom plan diagram of the switch lock apparatus of FIG. 1 in accordance with the present disclosure.

In further optional embodiments as illustrated in FIG. 4, a bottom of the body plate 120 surrounding the switch opening 130 may include a recessed portion 172. The recessed portion may be configured to accommodate any protrusion of the pickup selector switch which may otherwise interfere with the switch lock apparatus 100. The bottom and top of the body plate 120 may be switched by reversing the orientation during installation in order to take advantage of the recessed portion 172.

Figure 8:
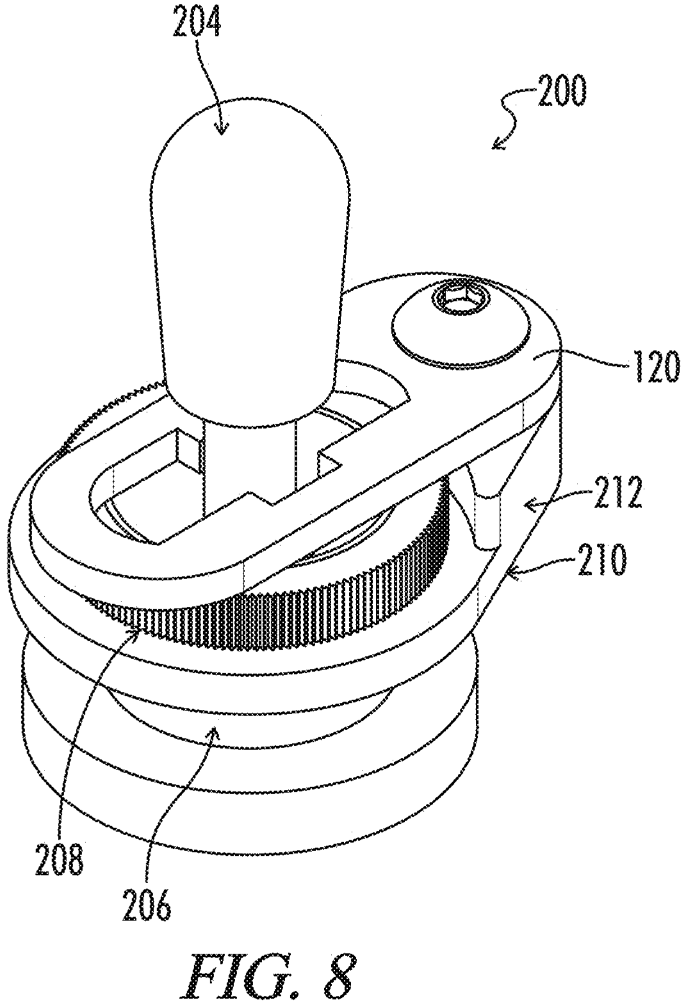
FIG. 8 is a perspective diagram of another embodiment of a switch lock apparatus in combination with a three-position pickup selector switch in accordance with the present disclosure.
Figure 9:
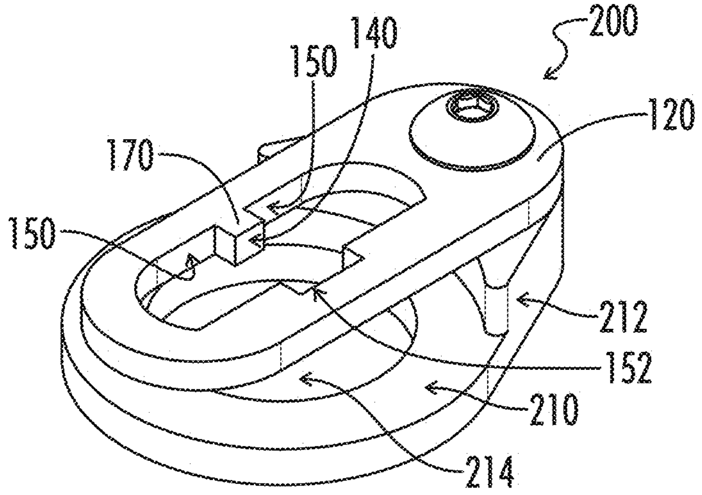
FIG. 9 is a perspective diagram of the switch lock apparatus of FIG. 8 in accordance with the present disclosure.
Figure 10:
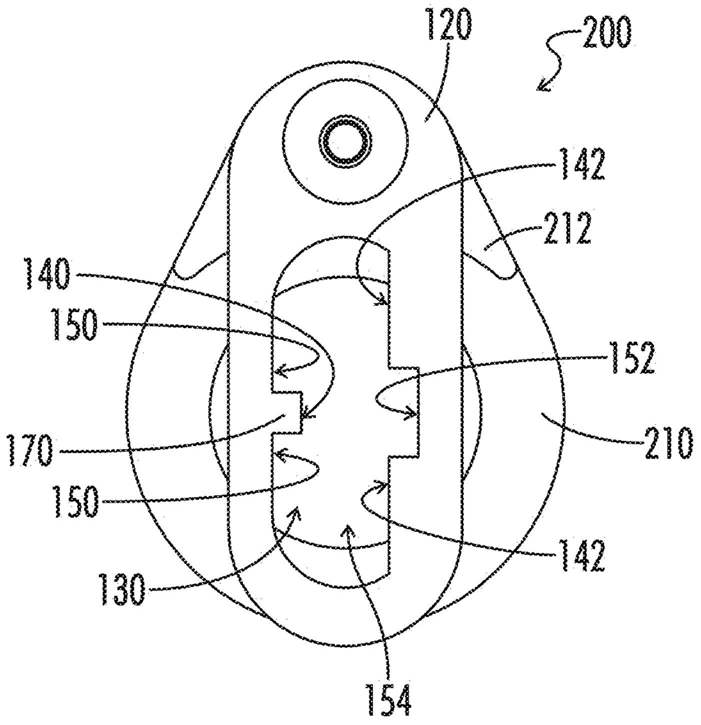
FIG. 10 is a top plan diagram of the switch lock apparatus of FIG. 9 in accordance with the present disclosure.

Referring to FIGS. 8-10, an embodiment of a switch lock apparatus 200 is shown. For simplicity, similar elements of the switch lock apparatus 200 may be numbered similarly to elements of the switch lock apparatus 100. The switch lock apparatus 200 is configured for use with a three-position pickup selector switch 204. The three-position pickup selector switch may be a “toggle” type pickup selector switch or a “mini” type pickup selector switch. Rather than including a pickup switch mounting screw 106 like the pickup selector switch 104, the three-position pickup selector switch includes a base cylinder 206 with a base cylinder nut 208 positioned thereon for attaching the three-position pickup selector switch to a guitar (not shown). Accordingly, the switch lock apparatus 200 may include a base portion 210 upon which the body plate 120 is pivotally attached thereto. The base portion includes a cylindrical opening 214 configured to be received by the base cylinder 206. The base portion is configured to be locked onto the base cylinder using the base cylinder nut 208. The base portion 210 may include a vertical portion 212 having a height equal to or greater than that of the base cylinder nut such that the body plate 120 is not interfered with by the base cylinder nut.

As illustrated, the at least one first side receptacle 150 of the switch lock apparatus 200 includes two first side receptacles and the at least one second side receptacle 152 of the switch lock apparatus 200 includes only one second side receptacle. As mentioned above, all the receptacles may be offset relative to each other such that they align with a post of the pickup selector switch when it is in one of the three selected positions.

While the switch lock apparatus 200 is illustrated for retrofit application, in other optional embodiments, the switch lock apparatus may be integrally formed with the pickup selector switch and/or the guitar during manufacture thereof.

In further optional embodiments, the at least one first side receptacle and the at least one second side receptacle should ideally include enough total receptacles corresponding to at least a number of positions of the pickup selector switch 104. Accordingly, one skilled in the art could modify the switch lock apparatus 100 or the switch lock apparatus 200 in order to fit different pickup selector switches having differing numbers of positions and/or different configurations.

Figure 11:
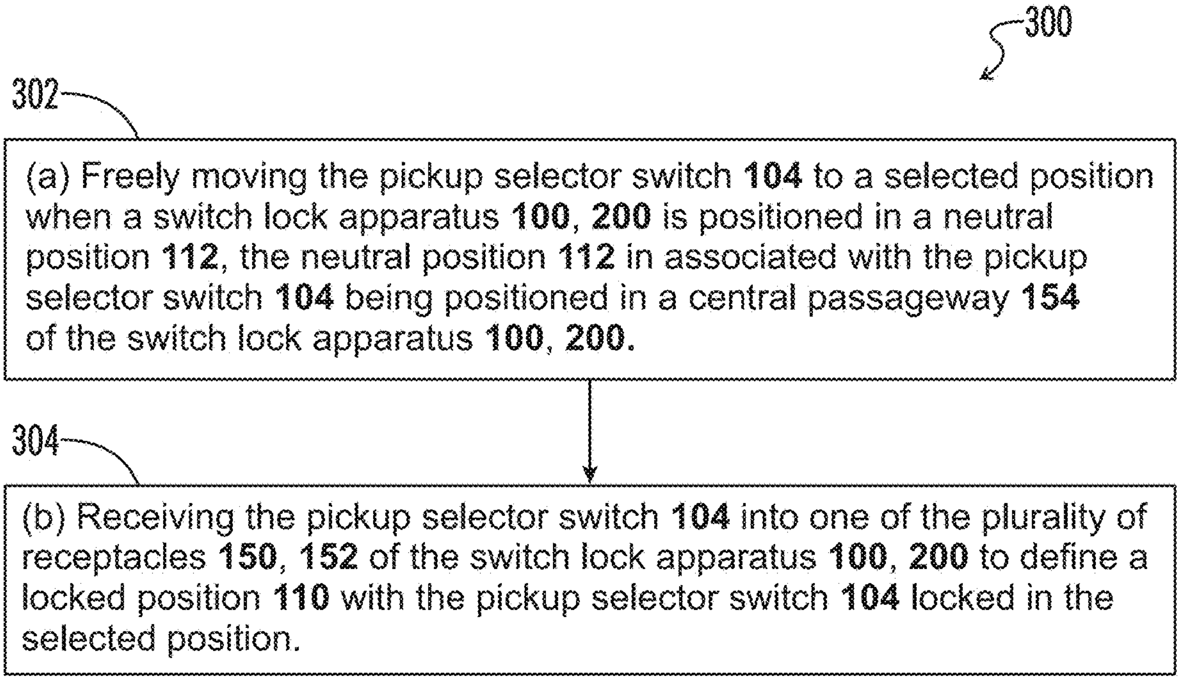
FIG. 11 is a flow diagram of a method of using a switch lock apparatus in accordance with the present disclosure.

Referring to FIG. 11, a method 300 of selectively locking a pickup selector switch 104 of a guitar 102, for example, using one of the switch lock apparatuses 100, 200. The method 300 may include (a) freely moving 302 the pickup selector switch 104 to a selected position when a switch lock apparatus 100, 200 is positioned in a neutral position 112. The neutral position 112 is associated with the pickup selector switch 104 being positioned in a central passageway 154 of the switch lock apparatus 100, 200. The method 300 may further include (b) receiving 304 the pickup selector switch 104 into one of a plurality of receptacles 150, 152 of the switch lock apparatus 100, 200 to define a locked position 110 with the pickup selector switch 104 locked in the selected position.

In certain embodiments, step (b) of the method 300 may further include pivotally rotating the switch lock apparatus 100, 200 relative to the pickup selector switch 104.

In other embodiments, step (b) of the method 300 may further include pivotally rotating the switch lock apparatus 100, 200 clockwise relative to the pickup selector switch 104 to position the pickup selector switch 104 in a first side receptacle 150 of the plurality of receptacles 150, 152 defined along a first switch opening side 140 of the switch lock apparatus 100, 200. Additionally, step (b) of the method 300 may further include pivotally rotating the switch lock apparatus 100, 200 counter-clockwise relative to the pickup selector switch 104 to position the pickup selector switch 104 in a second side receptacle 152 of the plurality of receptacles 150, 152 defined along a second switch opening side 142 of the switch lock apparatus 100, 200. In accordance with this embodiment, the first side receptacle 150 may be offset from the second side receptacle 152 relative to a switch opening length 136 of the switch lock apparatus 100, 200. Said offset may define the central passageway 154.

The method 300 may further comprise, prior to step (a), receiving the pickup selector switch 104 through a switch opening 130 of the switch lock apparatus 100, 200, and pivotally coupling the switch lock apparatus 100, 200 to the guitar 102 adjacent to the pickup selector switch 104. In accordance with this embodiment, the method 300 may further comprise coupling the switch lock apparatus 100, 200 to the guitar 102 using a mounting hole 126 of the switch lock apparatus 100, 200 offset from the switch opening 130.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A method of selectively locking a pickup selector switch of a guitar, the method comprising:

(a) freely moving the pickup selector switch to a selected position when a switch lock apparatus is positioned in a neutral position, the neutral position associated with the pickup selector switch being positioned in a central passageway of the switch lock apparatus; and (b) receiving the pickup selector switch into one of a plurality of receptacles of the switch lock apparatus to define a locked position with the pickup selector switch locked in the selected position, wherein the plurality of receptacles are defined along a first switch opening side and a second switch opening side, the plurality of receptacles are separated by gates, wherein each gate along the first switch opening side is positioned opposite a second side receptacle along the second switch opening side and each gate along the second switch opening side is positioned opposite a first side receptacle along the first switch opening side.

2. The method of claim 1, wherein step (b) further comprises:

pivotally rotating the switch lock apparatus relative to the pickup selector switch.

3. The method of claim 1, wherein step (b) further comprises:

pivotally rotating the switch lock apparatus clockwise relative to the pickup selector switch to position the pickup selector switch in a first side receptacle of the plurality of receptacles defined along the first switch opening side of the switch lock apparatus; and pivotally rotating the switch lock apparatus counterclockwise relative to the pickup selector switch to position the pickup selector switch in a second side receptacle of the plurality of receptacles defined along the second switch opening side of the switch lock apparatus.

4. The method of claim 3, wherein:

the first side receptacle is offset from the second side receptacle relative to a switch opening length of the switch lock apparatus.

5. The method of claim 1, further comprising, prior to step (a):

receiving the pickup selector switch through a switch opening of the switch lock apparatus; and pivotally coupling the switch lock apparatus to the guitar adjacent to the pickup selector switch.

6. The method of claim 5, further comprising:

coupling the switch lock apparatus to the guitar using a mounting hole of the switch lock apparatus offset from the switch opening.

* * * * *